Nov. 5, 1929. V. E. ROUCH 1,734,348
TIRE ALARM
Filed July 12, 1926
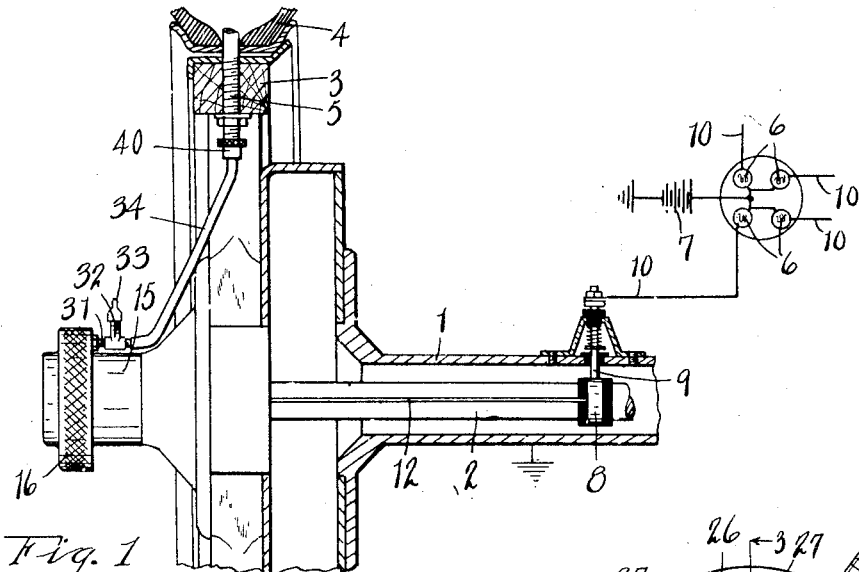
INVENTOR
Vernen E. Rouch
BY Chappell Earl
ATTORNEYS Patented Nov. 5, 1929

1,734,348

UNITED STATES PATENT OFFICE

VERNEN E. ROUCH, OF SOUTH BEND, INDIANA, ASSIGNOR OF ONE-HALF TO GLEN L. DICE, OF SOUTH BEND, INDIANA

TIRE ALARM

Application filed July 12, 1926. Serial No. 121,946.

The main objects of this invention are:

First, to provide an improved tire alarm which is effective for the purpose and is not likely to get out of order in use.

Second, to provide an improved tire alarm which may be embodied in automobiles or the like without marring the appearance thereof.

Objects pertaining to details and economies of my invention will definitely appear from the detailed description to follow. The invention is clearly defined and pointed out in the claims.

A structure embodying the features of the invention is clearly illustrated in the accompanying drawing forming a part of this application, in which:

Fig. 1 is a fragmentary sectional view of the rear wheel of an automobile having my improvements applied thereto, the parts being shown conventionally.

Fig. 2 is a front elevation of the hub cap and parts carried thereby with the housing member of the hub cap removed.

Fig. 3 is a detail section on a line corresponding to line 3—3 of Fig. 2.

Fig. 4 is a detail view mainly in section on a line corresponding to line 4—4 of Fig. 2.

Fig. 5 is a detail view illustrating the application of my improvements to the front wheel spindle.

Fig. 6 is a view corresponding to that of Fig. 2 showing further modification in the switch members.

Referring to the drawing, 1 represents the housing of a rear axle 2. 3 is a wheel provided with a pneumatic tire 4 having a stem 5. Signal lamps 6 are conventionally shown, there being a lamp for each wheel of the vehicle. These lamps are grounded in the metal frame of the vehicle as indicated and are connected to the battery shown at 7.

The axle is provided with a connector ring 8 with which the brush 9 coacts, this brush being mounted on the housing 1 and connected at 10 to the particular lamp selected for the wheel 3. The axle is provided with a connector 11 to which the circuit wire 12 is connected, the axle being preferably grooved at 14 and the connector 11 being centrally located as shown in Fig. 3.

The wheel is provided with a hub cap 15 provided with a housing part 16 adapted to form a chamber 17. The hub cap carries a spring pressed connector 18 coacting with the connector 11 on the axle, the connector on the hub cap and axle being insulated from the hub cap and axle by the insulation 181 and 111 of hard fibre or similar material, respectively. The member 18 is yieldingly supported by the spring 19 thus insuring an effective contact when the parts are assembled, avoiding great accuracy in forming the parts and mounting the hub cap and also providing a connection permitting the rotation of the front or steering wheel as indicated at 20 in Fig. 5.

In this case the circuit wire 21 is connected to a binding post 22 on the spindle arm 23, the lamp being indicated at 24 and its connection to the post 22 being indicated at 25. The parts are otherwise preferably the same as for the rear wheel, thus avoiding the necessity for special parts.

The hub cap carries a switch contact 26 which is adjustably supported by means of the screw 27 on the disk 28, the disk serving the purpose of a conductor and being insulated from the hub cap as illustrated.

I provide a Bourdon tube gage member 29 which is mounted at 30 on the hub cap with its free end in position to coact with the switch contact 26, the tube constituting a switch member and the hub cap being grounded through the metal parts of the wheel as is indicated in Fig. 1.

The Bourdon tube is connected to the tire stem 5. The connection preferably consists of the coupling 31 having a nipple 32 adapted to receive an air chuck for supplying air to the tire. This nipple is provided with a cap 33 and may, if desired, be provided with a valve although this is unnecessary. The flexible tube or conduit 34 connects this coupling with the valve stem, the coupling 40 being adapted to hold the valve of the stem open when the coupling is mounted on the stem.

With the parts thus arranged the pressure within the tube acts to hold the switch member 29 out of switch closing position. When the pressure falls below a predetermined point the switch is closed, thereby actuating the signal. In this connection I preferably provide a resistance element 35 which is wound upon the Bourdon tube switch member and grounded therein at 36, the resistance element having a contact 37 which is positioned to coact with the contact 26 prior to the engagement of the switch member 29 therewith. The result is that a signal is given of the deflation of the tire at a considerable period before the danger point is reached, that is, in the event of a gradual leak.

In the modification shown in Fig. 6 a pair of Bourdon tube switch members 38 is provided and a corresponding pair of contacts 39. The switch members are here shown in closed position.

In the modification shown in Fig. 6, my improvements are adapted to a double tire wheel such as are sometimes used on busses and the like, there being a pair of Bourdon tubes, switch members 38, and a corresponding pair of contacts 39, each of the Bourdon tubes being connected to a tire substantially as shown. The switch members are here shown in closed position.

My improved signal apparatus is reliable in its operation, the electrical connecting parts are so arranged as to be protected, and the structure may be applied with little change in vehicles as now constructed and without disfiguring the same.

I have not attempted to illustrate certain adaptations and modifications which might be desirable for different vehicles as I believe the disclosure made will enable those skilled in the art to embody or adapt my improvements as may be desired.

Having thus described my invention, what I claim as new and desire to secure by Letters Patent, is:

1. A device of the class described comprising a chambered hub cap, an axially disposed spring pressed circuit connector mounted within and electrically insulated from said hub cap and adapted to coact with a circuit connector carried by the axle of a wheel on which the cap is mounted, a switch contact mounted within and electrically insulated from said hub cap and electrically connected to said circuit connector on said hub cap, and a Bourdon tube switch member mounted within said hub cap in coacting relation to said switch contact and having a pneumatic tire connection.

2. A device of the class described comprising a chambered hub cap, a circuit connector mounted within and electrically insulated from said hub cap and adapted to coact with a circuit connector carried by the axle of a wheel on which the cap is mounted, a switch contact mounted within and electrically insulated from said hub cap and electrically connected to said circuit connector on said hub cap, and a pneumatic switch member mounted with said hub cap in coacting relation to said switch contact and having a pneumatic tire connection.

3. A device of the class described comprising a hub cap, a switch contact mounted within and electrically insulated from said hub cap, a coacting pneumatically controlled switch member mounted within said hub cap and electrically connected thereto, and a pneumatic tire connection for said pneumatically actuated switch member.

In witness whereof I have hereunto set my hand.

VERNEN E. ROUCH.